United States Patent [19]

Moore et al.

[11] Patent Number: 5,432,653
[45] Date of Patent: Jul. 11, 1995

[54] LOOP-SHAPED PNEUMATIC DRIVE

[75] Inventors: Arthur R. Moore, Deer Park, Wis.; Lynn R. Skow, North Branch; William M. Dunbar, Cottage Grove, both of Minn.

[73] Assignee: Minnesota Mining and Manufacturing Company, St. Paul, Minn.

[21] Appl. No.: 81,433

[22] Filed: Jun. 22, 1993

[51] Int. Cl.⁶ ............... B65H 20/00; B65H 29/24; G11B 5/008
[52] U.S. Cl. .................... 360/90; 226/97; 271/195; 360/106
[58] Field of Search ............... 360/84, 88, 90, 105, 360/106, 130.2–130.22, 137, 1–3; 226/97, 196; 271/195

[56] References Cited

U.S. PATENT DOCUMENTS

| Re. 32,284 | 11/1986 | Stange | 271/3 |
|---|---|---|---|
| 2,612,566 | 9/1952 | Anderson | 226/97 |
| 2,816,757 | 12/1957 | Burkhart | 271/2.1 |
| 2,905,768 | 9/1959 | Cronquist | 179/100.2 |
| 2,913,536 | 11/1959 | Fuller | 179/100.2 |
| 3,103,850 | 9/1963 | Khoury | 88/24 |
| 3,106,355 | 10/1963 | Warren | 242/55.01 |
| 3,127,120 | 3/1964 | Selsted | 242/55.12 |
| 3,134,527 | 5/1964 | Willis | 226/97 |
| 3,180,688 | 4/1965 | Futer | 302/29 |
| 3,198,515 | 8/1965 | Pitney | 271/26 |
| 3,231,165 | 1/1966 | Wallin | 226/97 |
| 3,270,933 | 9/1966 | Dekker | 226/97 |
| 3,347,437 | 10/1967 | Rush | 226/198 |
| 3,405,977 | 10/1968 | Albright | 302/29 |
| 3,418,434 | 12/1968 | Groenewegen | 179/100.2 |
| 3,428,514 | 2/1969 | Wilcox | 179/100.2 |
| 3,471,971 | 10/1969 | Van Den Berg | 179/100.2 |
| 3,576,282 | 4/1971 | Epina | 226/97 |
| 3,614,168 | 10/1971 | Range | 302/31 |
| 3,620,430 | 11/1971 | Baumann | 226/97 |
| 3,623,775 | 11/1971 | Arseneault | 226/97 |
| 3,645,581 | 2/1972 | Lasch, Jr. | 198/19 |
| 3,653,568 | 4/1972 | Cronquist | 226/97 |
| 3,678,216 | 7/1972 | Rousso, Jr. | 226/95 |

(List continued on next page.)

FOREIGN PATENT DOCUMENTS

| 615924 | 3/1961 | Canada | 226/97 |
|---|---|---|---|
| 1190063 | 4/1970 | United Kingdom . | |
| 1216123 | 12/1970 | United Kingdom . | |
| 1288686 | 9/1972 | United Kingdom . | |

OTHER PUBLICATIONS

"Non-contact drying and turning—the 'on machine' technology of the nineties" by Edward V. Bowden, pp. 41–46, paper presented at 44th Annual General Conference, Rotorua, 1990.

IBM Technical Disclosure Bulletin, vol. 18, No. 7, Dec. 1975, pp. 2141–2142.

Primary Examiner—Robert S. Tupper
Assistant Examiner—Jefferson Evans
Attorney, Agent, or Firm—Gary L. Griswold; Walter N. Kirn; Eric D. Levinson

[57] ABSTRACT

A loop-shaped drive and drive system for retrieving and storing information on flexible recording strips. The drive has a loop-shaped conduit having a working surface on its inner periphery. A fluid, such as air, is supplied to the conduit and emerges from an array of uniformly distributed orifices in the working surface. Fluid streams from the orifices support the recording strip above the working surface and transport it around the inner periphery of the loop-shaped conduit. As the strip travels around the loop-shaped conduit, it passes in close proximity with at least one transducer, thereby allowing the transducer(s) to read/write information on the strip.

24 Claims, 3 Drawing Sheets

U.S. PATENT DOCUMENTS

| | | | |
|---|---|---|---|
| 3,705,413 | 12/1972 | Cronquist | 209/110 |
| 3,708,136 | 1/1973 | Cope | 242/182 |
| 3,718,371 | 2/1973 | Lasch | 226/97 |
| 3,796,393 | 3/1974 | Beistle | 242/184 |
| 3,912,144 | 10/1975 | Arsenault | 360/84 |
| 3,918,706 | 12/1975 | Craft | 271/250 |
| 4,003,568 | 1/1977 | Stange | 271/225 |
| 4,015,880 | 4/1977 | Colvin | 302/31 |
| 4,055,340 | 10/1977 | Stange | 271/236 |
| 4,059,260 | 11/1977 | Stange | 271/3 |
| 4,081,201 | 3/1978 | Hassan | 302/31 |
| 4,144,618 | 3/1979 | Campo | 226/7 |
| 4,299,518 | 11/1981 | Whelan | 406/62 |
| 4,337,885 | 7/1982 | Stahler | 226/97 |
| 4,395,165 | 7/1983 | DeRobertis | 406/88 |
| 4,406,425 | 9/1983 | Bullock | 242/183 |
| 4,411,503 | 10/1983 | Bailey | 352/222 |
| 4,493,548 | 1/1985 | Ateya | 271/195 |
| 4,525,757 | 6/1985 | Imanishi | 360/130.24 |
| 4,568,223 | 2/1986 | Lenhart | 406/88 |
| 4,749,146 | 6/1988 | Bridger | 242/195 |
| 4,842,177 | 6/1989 | Callender | 226/97 |
| 4,858,808 | 8/1989 | Bingaman | 226/95 |
| 5,102,118 | 4/1992 | Vits | 271/195 |
| 5,135,149 | 8/1992 | Van Den Dungen | 226/118 |
| 5,203,485 | 4/1993 | Cahill | 226/97 |

LOOP-SHAPED PNEUMATIC DRIVE

FIELD OF THE INVENTION

The present invention relates to the pneumatic transport of flexible strips of material. More particularly, the invention relates to a drive system that uses fluid, such as air, to support and transport strips of material past a transducer.

BACKGROUND OF THE INVENTION

Devices which record magnetic or optical signals on magnetic tape are known. Typically, these devices accept tape which is stored on a reel or in a cassette and cause the media to be drawn past a transducer, which is fixed or moving, to allow signals to be read or written on selected regions of the tape. Because relatively long lengths of tape are used for recording significant amounts of information, the tape is typically stored on reels and the tape drawn past the transducer by a capstan or some other mechanical means. Pulling on the tape puts tension on the media which may cause it to wear, distort or even break in extreme cases such as a malfunction of the device. In addition, the inertia of the mass of tape stored on the reels results in relatively slow acceleration and deceleration of the tape packs on the reels. Rapid acceleration and deceleration also place significant stress on the tape. The amount of time required to accelerate and decelerate the tape packs limits the speed with which information encoded on the tape can be accessed by the drive system.

As the need for capturing more information in smaller spaces grows, the tape may be made thinner so that more tape surface can be stored in a given volume of storage space, such as a cartridge or cassette. Thus, tapes having a thickness of 25 $\mu$m or less are common, and 13 $\mu$m thick tape is often used. The fragile nature of such tape makes rapid access to random regions of the tape difficult because of the stress that is placed on the tape during rapid acceleration and deceleration of the reels.

U.S. Pat. No. 3,653,568 (Cronquist) discloses a pneumatic system for moving an elongated strip of flexible tape around a loop-shaped conduit. The tape is moved through a continuous and substantially enclosed passageway or tunnel within the conduit that has dimensions slightly greater than the tape moving therethrough. The tape is transported through the tunnel by an air flow which enters the tunnel from both sides of the tape at four locations spaced around the loop. The air flow is exhausted through four pairs of apertures spaced around the loop.

The pneumatic system disclosed in Cronquist has several disadvantages. First, because only four pairs of output nozzles are provided, the tape is not uniformly supported within the tunnel. As a result of this non-uniform support, the tape will tend to contact the inner surface of the tunnel as it moves around the loop, resulting in wear of the tape. The fact that the tunnel is enclosed, resulting in the need to provide exhaust openings within the tunnel, may also contribute to the non-uniform support of the tape. Second, because the air flow is directed at the tape from both sides of the tape, the air flow from above and below the tape must be symmetrical. All of the nozzles would probably have to be carefully tuned or calibrated to provide the appropriate air flow pattern within the tunnel. The nozzles might also have to be re-calibrated for different lengths of tape. Third, the duct design is fairly complex.

SUMMARY OF THE INVENTION

The present invention overcomes the disadvantages of the prior art devices by providing a pneumatic device that is able to manipulate a recording strip with directed fluid streams. The use of directed fluid streams to support and transport the recording strip provides a distributed motive force on the strip, rather than a localized, mechanical, pulling force, so that the strip is manipulated without substantial lengthwise tension on the media. Because the media is carried by a cushion of fluid, acceleration and deceleration can occur rapidly without producing significant tension on the media in the direction of travel. The uniformly distributed directed fluid streams support the recording strip, thereby minimizing wear of the tape due to contact with the device.

The design of the pneumatic drive according to the present invention allows the recording strip to be accelerated and decelerated very rapidly. As a result, random points on the tape can be accessed very quickly, exceeding the access rates that are typically present when mechanical devices are used.

The present invention includes a drive having a loop-shaped conduit having a working surface on its periphery. A fluid, such as air, is supplied to the conduit and emerges from an array of orifices uniformly distributed throughout the working surface. Fluid streams from the orifices support a strip above the working surface and transport it around the periphery of the loop-shaped conduit. As the strip travels around the periphery of the loop-shaped conduit, it passes in close proximity with at least one transducer, thereby allowing the transducer(s) to sense the properties of the strip. The strip can be a recording strip and the working surface can be provided on the inner periphery of the loop-shaped conduit. Thus, the recording strip can be transported around the inner periphery of the conduit in close proximity to the transducer(s), thereby allowing information to be transferred between the transducer(s) and the recording strip.

In one embodiment, the drive described above further includes a linear conduit, also having a working surface, for transporting the strip onto the working surface of the loop-shaped conduit. In another embodiment, the working surface of the loop-shaped conduit has a second array of orifices so that the strip can be transported around the periphery of the loop-shaped conduit in either direction. In yet another embodiment, the drive includes a means for inverting the strip in the drive so that the transducer(s) may read/write on both sides of the strip. In still yet another embodiment, at least one transducer is positioned within the interior of the area bounded by the loop-shaped conduit so that the strip can pass between it and the working surface of the loop-shaped conduit. In still another embodiment, the array of orifices in the working surface of the loop-shaped conduit can include a linear array of orifices on each side of and parallel to the centerline of the working surface.

The present invention also includes a loop-shaped drive system having the loop-shaped conduit and linear conduit described above. The system also includes a fluid source for providing fluid to the linear and loop-shaped conduits. At least one transducer is proximate the working surface of the loop-shaped conduit, whereby information may be transferred between the transducer(s) and the strip as the strip is transported past the transducer(s).

The present invention also includes a method of transferring information between a loop-shaped drive and a recording strip. The method includes the following steps. Fluid streams are directed from an array of orifices in the working surface on the inner periphery of the loop-shaped conduit. The fluid streams support and transport the recording strip around the inner periphery of the loop-shaped conduit. At least one transducer transfers information between the strip and the transducer(s) as the strip is transported past the transducer(s).

As used herein, the term "transducer" means anything that is capable of sensing the properties of a flexible strip, including, for example, a magnetic or optical read/write head. The term "read/write" means read and/or write. The term "recorded strip" means any strip that is capable of storing information. The terms "proximate" and "close proximity" mean close enough to allow a transducer to read/write on a recording strip.

DETAILED DESCRIPTION

Figure 1:
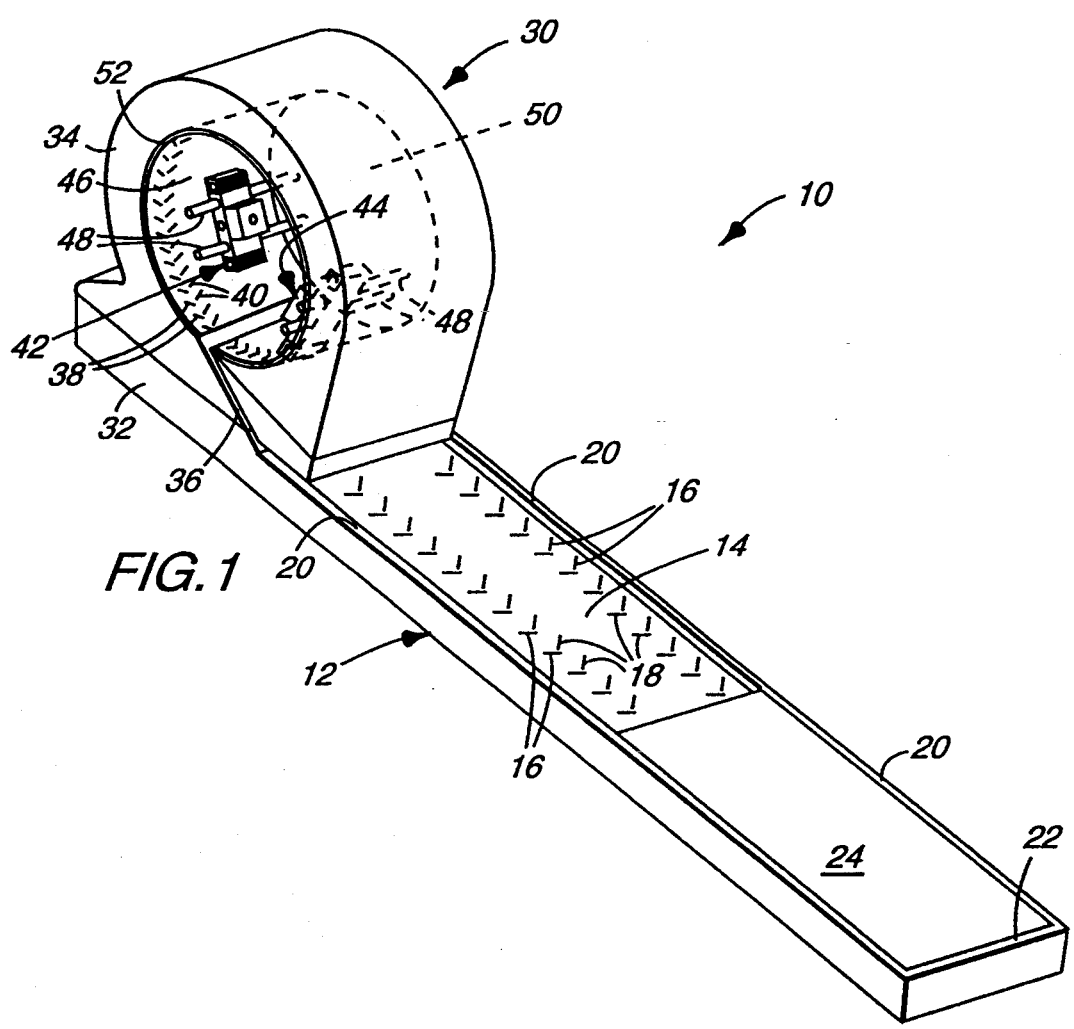
FIG. 1 is a schematic perspective view of a drive system according to the present invention.

The invention can be illustrated by reference to FIG. 1 wherein a simple drive system 10 comprising a loop-shaped drive 30 and a supply conduit such as linear supply conduit 12 is shown. Linear conduit 12 comprises working surface 14 having fluid orifices 16 and 18 communicating with a fluid supply manifold within the conduit. Orifices 16 and 18 are preferably oriented so that their downstream edges are directed at an angle toward the outer edges of linear conduit 12. Thus orifices 16 will generally be activated to cause a flexible recording strip 24 to enter drive 30 and reverse orifices 18 will be activated to cause the strip to exit drive 30. Optional edge guides 20 and end wall 22 help physically confine recording strip 24 on linear conduit 12.

Drive 30 comprises a base 32 supporting a loop-shaped conduit 34 with its inner periphery forming a working surface 46 to support and transport strip 24 as it travels within the drive. Working surface 46 contains orifices 38 and 40 for expelling fluid from the manifold (not shown) contained within the interior of loop-shaped conduit 34 to transport strip 24 around the interior of the loop. As with linear conduit 12, the downstream edges of orifices 38 and 40 are shown angled outwardly relative to the direction of travel of strip 24. Thus, orifices 38 are activated to cause strip 24 to travel in a clockwise direction and orifices 40 are activated to cause the strip to travel in a counter-clockwise direction, as viewed in FIG. 1.

A first transducer 42 is attached to side wall 50 of drive 30 by guide/support members 48. Various mechanisms can be employed to allow transducer 42 to move across the width of working surface 46 in close proximity to strip 24 when it enters drive 30 so that all information tracks on strip 24 can be accessed by the transducer. The transfer of information between transducer 42 and strip 24 may be interrupted by the leading or trailing edge of the strip. Thus, a second transducer 44 may optionally be included as shown in FIG. 1. Second transducer 44 can be aligned with first transducer 42 to provide for the continuous transfer of information between the transducers and recording strip 24 when read/writing on an information track on the strip.

Optional side wall 50 and edge guide 52 serve to keep strip 24 from straying off working surface 46. Although the illustrated embodiments included herein are described as using air, system 10 can operate with various other fluids such as water, inert fluorocarbons, and various other gases and gas mixtures.

Figure 2:
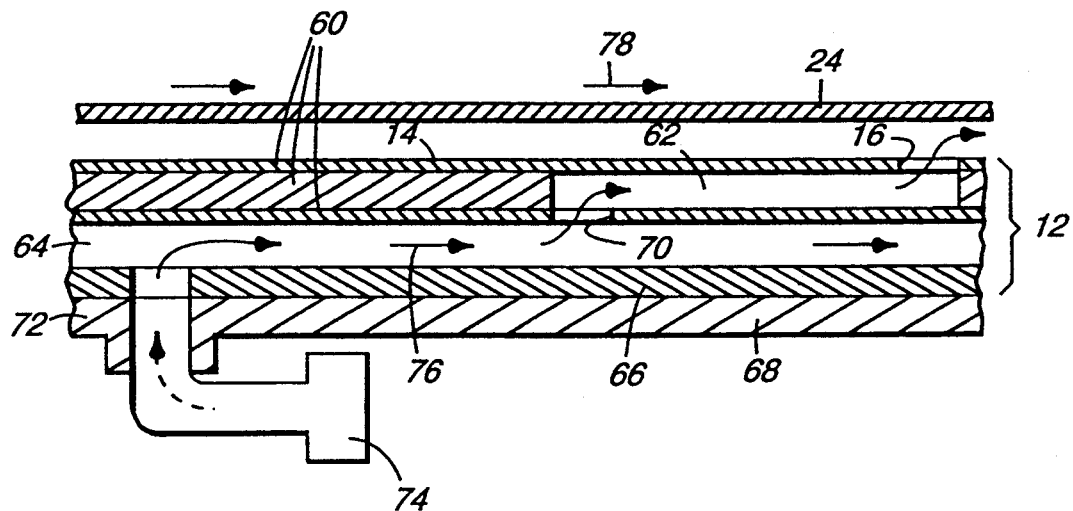
FIG. 2 is a schematic cross-sectional side view of the linear conduit shown in FIG. 1.

The following discussion regarding linear conduit 12 also applies to loop-shaped conduit 34. As shown in FIG. 2, linear conduit 12 comprises working surface 14, layers 60, plenum chamber 62, supply manifold 64, and bottom surface 66. Plenum chamber 62 communicates with supply manifold 64 via inlet 70 and working surface 14 via orifices 16. Linear conduit 12 may be provided on a support 68. A fluid source 74, such as a compressor or fan, supplies pressurized fluid to supply manifold 64 via an inlet 72 through bottom surface 66 and optional support 68. The direction of the fluid flow within conduit 12 is shown by arrows 76. The pressurized fluid exits through orifices 16 in a jet-like flow against strip 24, thereby supporting the strip and causing it to move along working surface 14 in the direction of arrows 78.

Conduit 12 can include three layers 60 which form a web of flexible material which is supported by support 68, which can be rigid. Fluid enters the first layer 60 from supply manifold 64 via inlet 70. Plenum chamber 62 in the second layer 60 establishes the direction of the fluid flow. The fluid exits via orifice 16 in the third layer 613. Layers 60 can be as thin as, for example, about 0.01 mm and can be any flexible material. Layers 60 can be joined or laminated by bonding, welding, or using adhesives. In the alternative, layers 60 can simply be pressed together without bonding. Layers 60 can be pre-coated with an adhesive on the outermost bottom layer and conduit 12 can be attached like adhesive tape to a mounting surface which has ports to communicate with those in the bottom of conduit 12. A release layer, such as silicone treated paper, may optionally be included to facilitate storage and unwinding of the article.

Layers 60 can be formed of plastics, metals, ceramics, or composite materials. To prevent static charge buildup on working surface 14, the working surface can be metallic or conductive plastic. The openings in each layer 60 can be formed by any known method including etching, punching, drilling, stamping, or laser cutting. The openings can be perpendicular to or at acute angles with the surface of the layer. Also, plenum chamber 62 formed when layers 60 are stacked need not be straight or linear and can have any desired shape.

In the alternative, layers 60 can be replaced with a single layer having a plurality of holes provided therethrough which allow supply manifold 64 to communicate with working surface 14. The holes may be provided by a drill, for example, and should be oriented to roughly approximate the angle provided by the fluid path shown in FIG. 2 from inlet 70 to orifice 16. The single layer can be rigid or flexible.

Fluid passes through orifices 16 in working surface 14 in the direction of arrows 86, thereby supporting and transporting strip 24. The operation of system 10 can be varied by changing the pattern, direction, angle, shape, and length of orifices 16, the thickness of layers 60, the fluid pressure, and the physical properties of strip 24. The operation of the system can also be altered by changing the angle a, shown in FIG. 3, at which the fluid exits orifices 16. (For the sake of clarity, orifices 18 are not shown in FIG. 3.) Directional component 84 of the fluid stream both supports and transports strip 24 while cross-directional component 80, perpendicular to directional component 84, contributes only to the support of the strip. Cross-directional component 80 and directional component 84 combine to yield flow direction 82. When the fluid exits with no cross-directional component 80, conduit 12 transports strip 24 with less support than if there were a cross-directional component. When the fluid exits with some cross-directional component, conduit 12 transports strip 24 with increased support. When the fluid exits with no directional component 84, conduit 12 holds strip 24 with no transport.

The fluid stream exiting plenum chamber 62 via orifices 16 creates a controllable gap between working surface 14 of conduit 12 and strip 24. The gap is established by balancing and maintaining equilibrium among the forces, including gravity, on strip 24. System 10 can operate to transport strip 24 regardless of whether the working surface is in a horizontal or vertical orientation, or at any orientation along the 360° circle of positions.

The use of directed fluid streams to support and carry recording strip 24 provides a distributed motive force on the strip, rather than a localized pulling force, so that the strip is manipulated without substantial lengthwise or downweb tension on the strip. Because strip 24 flies over a cushion of fluid, acceleration and deceleration can occur rapidly without producing significant tension on the strip.

It has been found that a relatively stable separation between the strip and the working surface is possible with the configurations described herein. The strip can be prevented from touching the working surface while still being held closely thereto as the strip follows a straight or curved path. The stable separation between the strip and the working surface is also maintained as the strip moves past the transducer(s).

Figure 3:
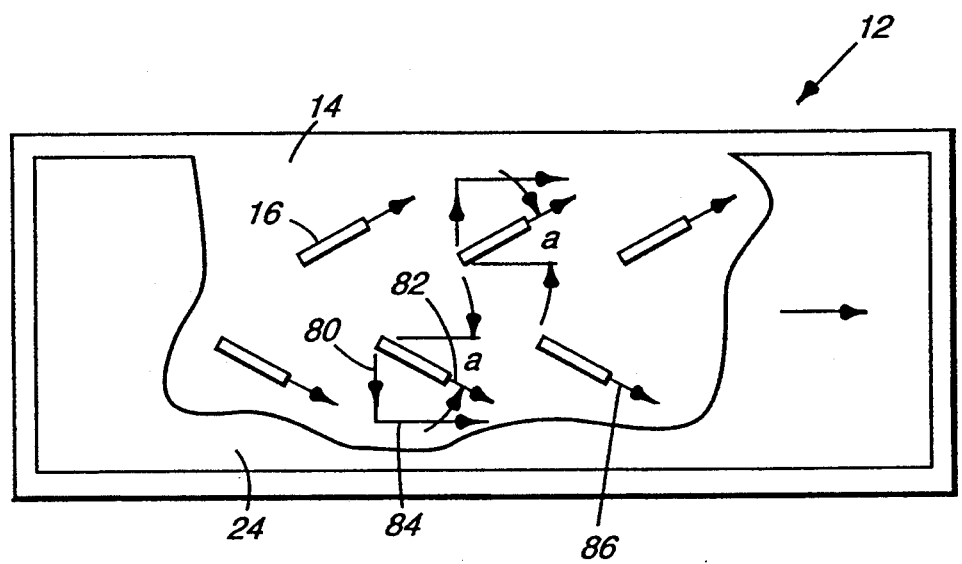
FIG. 3 is a schematic top view of the linear conduit shown in FIG. 2.

The fluid streams shown in FIGS. 2 and 3 provide a pneumatically induced tension across the width of strip 24, thereby minimizing the flutter and vibration of the strip. The fluid streams also provide for exhaust of the fluid from the open working surface without the need for special grooves or other exhaust structures. Drive system 10 is also advantageous because it avoids the use of tape guides or capstans, which are major contributors to wear on recording tape by the recording system.

Drive system 10 operates as follows. Recording strip 24 is positioned on working surface 14 at the end of linear conduit 12 opposite drive 30. Fluid streams originating from orifices 16 are then activated to transport strip 24 toward drive 30. Strip 24 enters loop-shaped conduit 34 via slot 36 in loop-shaped conduit 34. A working surface having a plurality of orifices (not shown) could be provided in slot 36 to facilitate transport of strip 24 into loop-shaped conduit 34. Strip 24 is then transported by fluid streams originating from orifices 38 into the interior of loop-shaped conduit 34.

Fluid streams originating from orifices 38 in working surface 46 of loop-shaped conduit 34 transport strip 24 around the inner periphery of loop-shaped conduit 34.

The rate at which information is transferred between strip 24 and loop-shaped drive 30 depends, among other things, on the speed with which the strip moves with respect to the transducers and the number of such transducers provided. The rotational speed of strip 24 in the loop can be as high as 1,800 rev/min or more. Although two transducers 42 and 44 are shown in FIG. 1, additional transducers may be provided to increase the rate at which information is transferred between strip 24 and loop drive 30.

Strip 24 is transported around the interior of loop-shaped conduit 34 as many times as necessary to allow transducer guide/support members 48 to manipulate transducers 42 and 44 across the width of the strip to read/write all of the information tracks on the strip. For example, if there were 200 information tracks on strip 24, 100 revolutions would be required to allow the two transducers to cover all of the tracks, assuming one read/write channels per transducer. If the number of transducers were doubled, the number of revolutions required, and thus the amount of time required, could be halved. Similarly, the number of read/write channels per transducer could be increased, thereby decreasing the number of revolutions required.

Once the desired information has been transferred between strip 24 and loop drive 30, fluid streams originating from reverse orifices 40 are activated, and the fluid streams originating from orifices 38 are deactivated, to stop the clockwise rotation (as viewed in FIG. 1) of the strip within the loop drive. Strip 24 is then transported by fluid streams originating from reverse orifices 40 back out of loop drive 30 through slot 36. Fluid streams from reverse orifices 18 on working surface 14 then transport strip 24 completely out of loop drive 30 and toward end wall 22 of linear conduit 12.

It may also be desirable to read/write on strip 24 with the strip moving in a counter-clockwise direction, as viewed in FIG. 1. This may be done by activating reverse orifices 40 within loop drive 30 and by providing pneumatic or mechanical means (not shown) near slot 36 in working surface 46 to prevent strip 24 from exiting the interior of loop drive 30. Thus, the fluid stream would allow information to be transferred between strip 24 and loop drive 30 in the counterclockwise rotation in the same manner discussed above with respect to the clockwise direction. Strip 24 could then be removed from loop drive 30 by deactivating the fluid stream.

Figure 4:
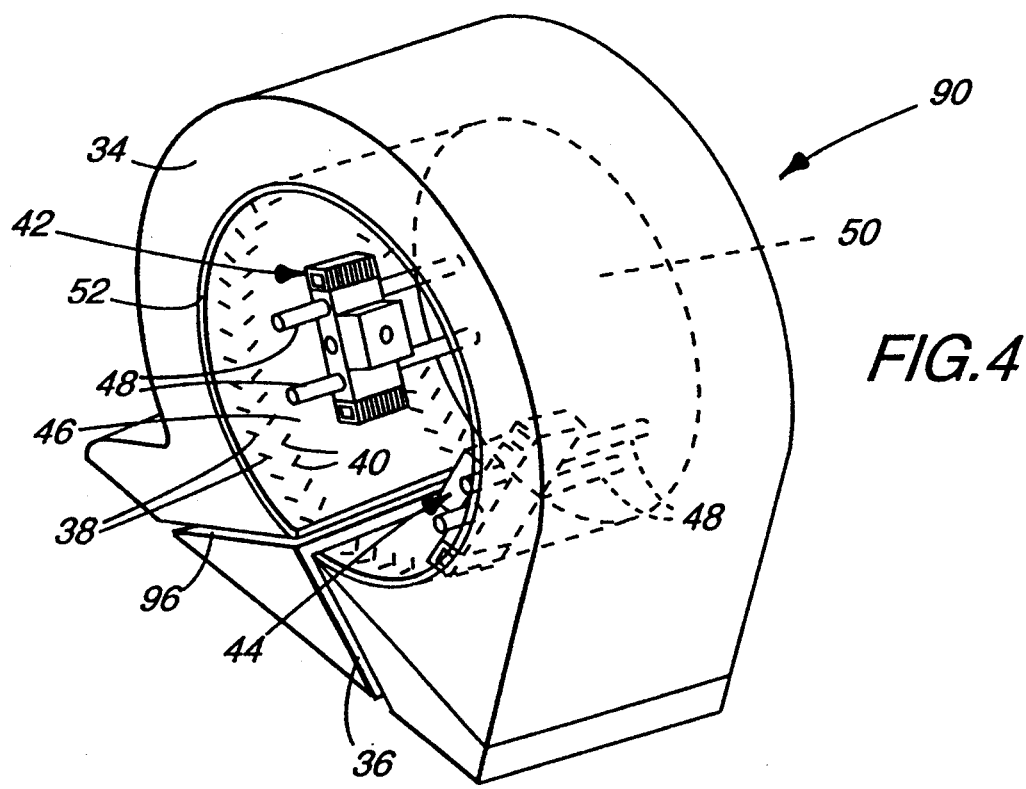
FIG. 4 is a schematic perspective view of a loop-shaped drive according to an alternative embodiment of the present invention.

An alternative embodiment of the present invention is shown as loop-shaped drive 90 in FIG. 4. Drive 90 resembles drive 30 with the exception that a second slot 96 is provided in loop-shaped conduit 34 in addition to slot 36. Like slot 36, a working surface having a plurality of orifices (not shown) could be provided in slot 96 to facilitate transport of strip 24 in and out of loop-shaped conduit 34. Slot 96 allows strip 24 to be moved in one slot and out the other without ever having to change the direction of travel of the strip around the inner periphery of loop-shaped conduit 34. Thus, a second strip could be brought into one slot while strip 24 exits the loop via the other slot, so that the second strip could be inserted into the loop immediately after the first strip exits the loop. The addition of slot 96 also allows loop drive 30 to receive strip 24 from either direction.

It may be desirable to increase the information capacity of strip 24 by allowing for the reading/writing of information on both sides of the strip. Thus it may be desirable to provide a mechanism in drives 30 and 90 for inverting strip 24 within loop drive 30 so that both sides (in turn) of the strip can be read/written by transducers within the loop.

Figure 5:
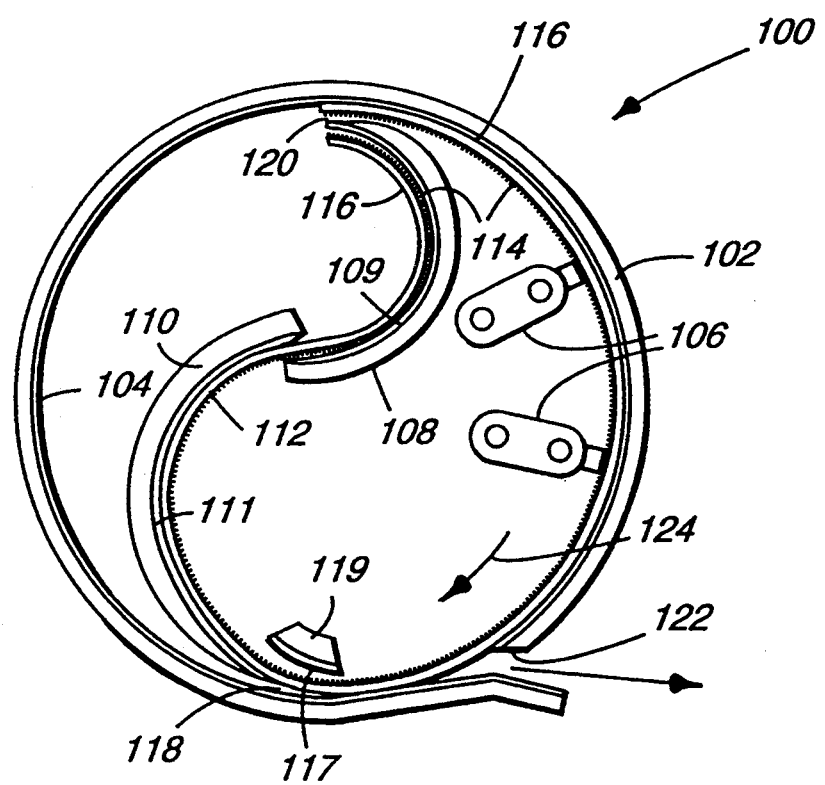
FIG. 5 is a schematic side view of a strip-inverting loop-shaped drive according to the present invention.

One such device for inverting strip 24 is shown as strip-inverting loop-shaped drive 100 in FIG. 5. Strip-inverting loop drive 100 is comprised of loop-shaped conduit 102 having working surface 104 within its inner periphery. Fluid streams originate from orifices (not shown) in working surface 104 just as they do in drives 30 and 90. Drive 100 includes transducers 106 and entrance/exit slot 122. Two C-shaped inverting curves 108 and 110 having working surfaces 109 and 111, respectively, (also having fluid streams originating from orifices which are not shown) are provided within loop-shaped conduit 102. C-shaped inverting curves 108 and 110 are positioned to provide an S-shaped path within loop-shaped conduit 102. Inverting curves 108 and 110 are separated from loop-shaped conduit 102 by gaps 120 and 118, respectively.

A recording strip 112 having a first recording surface 114 and a second recording surface 116 is shown in FIG. 5. First recording surface 114 is shown as being notched in FIG. 5 solely to illustrate how strip 112 is inverted by inverting curves 108 and 110.

Drive 100 operates as follows. Recording strip 112 enters drive 100 through slot 122 and is transported around the interior surface of the loop-shaped conduit 102 in a clockwise direction, as shown in FIG. 5. Strip 112 then passes by transducers 106 as it continues its clockwise travel around the interior of loop-shaped conduit 102, as indicated by direction arrow 124. Strip 112 may be transported around loop-shaped conduit 102, and thus through gaps 118 and 120, as many times as necessary to allow transducer guide members (not shown) to manipulate transducers 106 to read/write on all of the information tracks across the width of first recording surface 114 on the strip.

Strip 112 may then be turned over as follows. As strip 112 approaches gap 118, fluid streams emanating from working surface 117 of conduit 119 cause the strip to leave working surface 104 of loop-shaped conduit 102 and instead follow working surface 111 of C-shaped inverting curve 110. As strip 112 approaches the end of inverter 110, it continues onto working surface 109 of C-shaped inverting curve 108. Strip 112 then continues onto working surface 104 of loop-shaped conduit 102. Strip 112, now with its first recording surface 114 facing working surface 104 of loop-shaped conduit 102, moves in a counter-clockwise direction, as viewed in FIG. 5, and passes through gap 118 in route to transducers 106. Now, however, as strip 112 passes transducers 106, second recording surface 116 is read/written by transducers 106.

Strip 112 may be transported around loop-shaped conduit 102 in the counter-clockwise direction as many times as desired to allow transducers 106 to read/write on all of the information tracks provided on second recording surface 114 on the strip. Strip 112 can then exit drive 1130 via slot 122.

Inverting curves 108 and 110 can be the same size or not, having the same radius of curvature or not, and can be of any shape which changes the orientation of strip 112.

Drives 30, 90, and 100 can be constructed from various metals, plastics, composites, etc., but can also be made from any material than can be molded into the shape of a loop. The working surfaces of the drives are preferably made of metal, but can also be made of plastics, composites, etc. The drives preferably have diameters within the range of from about 1 to 2 m. Larger drives will have the capability of employing more transducers and accommodating longer recording strips.

The shapes of the loop-shaped conduits can be circular, as shown in the Figures, or they can be in the shape of an oval having two parallel sides, an ellipse, in the shape of a rectangle having rounded corners, or irregular. However, no curve within the loop should be so sharp that the recording tape cannot be smoothly transported around the loop by the fluid streams.

The orifices 16, 18, 38, and 40 are each preferably provided in two linear arrays, one positioned on each side of and parallel to the centerline of the working surface. The two arrays can be staggered with respect to each other. The orifices can be rectangular and have dimensions of about 1 mm wide by 5 mm long, and can be oriented outwardly in the direction of travel of the recording strip at an angle a of about 30 degrees with respect to the centerline. The orifices can have a frequency of about 45 to 180 pairs per meter.

The recording strip is preferably any sheet which is capable of storing information which can be retrieved by magnetic or optical means. The recording strip is preferably high performance video/data magnetic recording tape such as S-VHS. The tape may be capable of storing information on either one or both of its sides. The strip preferably has a length within the range of from about 12 cm to 5 m and a width within the range of from about 1.25 cm to 20 cm. The strip should be about as long as the inner periphery of the loop-shaped conduit with which it is intended to be used in order to minimize access times, but the strip can also be longer or shorter than the inner periphery. The strip will typically have a weight per unit area of about 3 mg/cm$^2$.

Although working surface 46 is shown on the inner periphery of loop-shaped conduit 34, it may instead be provided on the outer periphery. Strip 24 will still be held closely to the working surface, although this may be increasingly difficult to do at high speeds. Multiple working surfaces can also be used to provide special functions such as changing the direction of travel of the strip, bridging gaps, and braking.

The transducer(s) can be provided on the side of the strip opposite the working surface, or can be provided behind, within, or protruding from the working surface. A second working surface could also be positioned on the opposite side of the strip from the first working surface, with the transducer(s) being provided within the second working surface.

It will be obvious to those skilled in the art that having a device such as the one disclosed herein that can precisely read and write information on a strip and which leaves one surface of the strip exposed can have applications in imaging, photography, x-ray, and other display or image gathering devices. Although the invention has been described for use with flexible recording strips, the invention can be used with any flexible strip of material that has properties which can be sensed by a transducer.

The present invention will now be further illustrated by the following nonlimiting examples. All measurements are approximate.

EXAMPLE 1

A drive system 10 as shown in FIG. 1 was constructed. Loop-shaped drive 30 had a circumference of 25.4 cm and a width of 2.54 cm. A VHS type transducer 42 having a recording track width of 20 $\mu$m was employed. Recording strip 24 was a conventional video recording tape having a thickness of about 25 $\mu$m and a coercivity of about 650 oersteds. Fluid orifices 16 and 38 each consisted of two linear arrays of orifices positioned on either side of and parallel to the centerline of working surfaces 14 and 46, respectively, as shown in FIG. 1. Orifices 16 and 38 were oriented at an angle a, as shown in FIG. 3, of 30 degrees. The orifices were about 3.5 mm from the edge of strip 24. There were about 90 pairs of orifices per column per meter. The two columns of orifices were staggered as shown in FIG. 3. Orifices 16 had a length of about 5 mm and a width of about 1 mm. Conduit 12 was 25.4 cm long and had 45 orifices 16.

The strip of magnetic tape was driven within drive 30 at speeds ranging from 960 cm/s to 1,650 cm/s. The two speeds bounding that range were achieved with line pressures of 16 psi ($1.1 \times 10^5$ pascals) and 26 psi ($1.5 \times 10^5$ pascals), respectively, and air flow rates of 130 SCFH (3.7 SCMH) and 170 SCFH (4.9 SCMH), respectively.

A signal was recorded at a frequency of 4 to 5 MHz with a tape-transducer penetration of about 50 $\mu$m. The video still frame image evidenced only a slight horizontal timebase instability and a good RF envelope, indicating its suitability for digital recording. Very good tracking was observed in the horizontal position.

EXAMPLE 2

A drive system 10 as shown in FIG. 1 was constructed. Loop-shaped drive 30 had a circumference of 38.1 cm and a width of 2.54 cm. A data cartridge transducer 42 having a recording track width of 180 $\mu$m and a read track width of 76 $\mu$m was employed. Recording strip 24 was a conventional video recording tape having a thickness of about 25 $\mu$m and a coercivity of about 650 oersteds. Fluid orifices 16 and 38 were identical to those described in Example 1. Conduit 12 was 38.1 cm long and had 67 orifices 16.

Strip 24 was driven within drive 30 at a speed of 300 cm/s. The recording density was about 8,000 flux changes per centimeter and the data transfer rate was about 2.4 Megabits per second. Two million passes were made on a single track. No uncorrectable errors were found at the byte level, and very little bit error change was detected.

EXAMPLE 3

A loop-shaped drive 30 in the shape of an oval having two parallel sides, was constructed having an inner periphery 25.4 cm long and a width of 2.54 cm. Drive 30 did not have a transducer. Strip 24 and orifices 16 were the same as those in Example 1. Strip 24 was transported at a speed of 1,270 cm/s with a power consumption of about 10 watts. Strip 24 was manually loaded and unloaded and the drive continued to function at all orientations.

EXAMPLE 4

A drive system 10 as shown in FIG. 1 was constructed. Loop-shaped drive 30 had a circumference of 51.5 cm and a width of 5.08 cm. Drive 30 did not have a transducer. Recording strips 24 were conventional video recording tape having thicknesses of 25 $\mu$m and 51 $\mu$m, and coercivities of about 650 oersteds. Recording strips 24 were about 6 mm longer than the circumference of drive 30, so that there was a slight overlap of the strip in the loop.

A speed of 1,270 cm/s was achieved with a line pressure of about 4 psi ($2.8 \times 10^4$ pascals) and an air flow rate of about 6-7 SCFH (0.17-0.2 SCMH). Only a slight amount of wear of strips 24 was observed in the overlapping region after 130 million cycles.

We claim:

1. A loop-shaped drive comprising a loop-shaped conduit having a thickness defined by an inner periphery wall and an outer periphery wall, each of said surfaces, said working surface having a plurality of orifices uniformly distributed throughout for directing fluid, supplied to said conduit, to support a strip adjacent to and spaced from said working surface and to transport said strip around said one of said exterior surfaces in at least a first direction and into close proximity with at least one transducer, whereby said at least one transducer can sense the properties of said strip.

2. The drive of claim 1, wherein said strip is a recording strip, whereby information can be transferred between said at least one transducer and said recording strip as said strip passes in close proximity to said at least one transducer.

3. The drive of claim 1, wherein said working surface is provided on said exterior surface of said inner periphery wall, whereby said strip is transported around said exterior surface of said inner periphery wall of said loop-shaped conduit.

4. The drive of claim 1, wherein said working surface has a second plurality of orifices for directing fluid to support and transport said strip in a second direction, wherein said drive can transport said strip around said one of said exterior surfaces of said loop-shaped conduit.

5. The drive of claim 1, further comprising means within said drive for changing the side of said strip that faces said working surface, thereby allowing said at least one transducer to sense the properties of both sides of said strip.

6. The drive of claim 1, wherein said plurality of orifices in said working surface comprises two linear arrays of orifices, wherein one linear array is provided on each side of and parallel to the centerline of said working surface to transport said strip in said first direction.

7. The drive of claim 1, wherein said working surface is non-enclosed working surface.

8. A loop-shaped drive for recording strips, comprising a loop-shaped conduit defined by an inner peripheral wall and an outer peripheral wall, each of said peripheral walls having an interior surface within said conduit and an exterior surface outside of said conduit, said conduit having a working surface on said exterior surface of said inner peripheral wall, said working surface having a plurality of orifices uniformly distributed throughout for directing fluid, supplied to said conduit, to support a recording strip adjacent and spaced from said working surface and to transport said recording strip around said inner peripheral wall of said loop-shaped conduit in at least a first direction and into close proximity with at least one transducer, whereby information may be transferred between said at least one transducer and said recording strip.

9. The drive of claim 8, wherein said working surface has a second plurality of orifices for directing fluid to support and transport said recording strip in a second direction, wherein said drive can transport said strip around said inner periphery in both direction.

10. The drive of claim 8, further comprising means within said drive for changing the side of said recording strip that faces said working surface, thereby allowing information on both sides of strip to be transferred between said at least one transducer and said strip.

11. The drive of claim 8, wherein said plurality of orifices in said working surface comprises two linear arrays of orifices, wherein one linear array is provided on each side of and parallel to the centerline of said working surface to transport said recording strip in said first direction.

12. The drive of claim 8, wherein said at least one transducer is positioned so that said recording strip can pass between said at least one transducer and said working surface.

13. The drive of claim 8, wherein said recording strip is a magnetic strip and said at least one transducer is a magnetic head.

14. The drive of claim 13, wherein said recording strip has a plurality of available recording tracks, and further including a second magnetic head, wherein said heads are aligned to provide a continuous transfer of information between said heads and said recording strip.

15. A loop-shaped drive system, comprising:
a loop-shaped conduit defined by an inner peripheral wall and an outer peripheral wall, each of said peripheral walls having an interior surface within said conduit and an external surface outside of said conduit, said conduit having a first working surface on one of said exterior surfaces, said first working surface having a plurality of orifices uniformly distributed throughout for directing a fluid, supplied to said conduit, to support a recording strip adjacent to and spaced from said working surface and to transport said strip around said one of said exterior surfaces of said loop-shaped conduit, said loop-shaped conduit having a slot provided therein through which a strip may pass;
a linear conduit having a second working surface, said second working surface having a second plurality of orifices uniformly distributed throughout for directing fluid, supplied to said linear conduit, to support a strip adjacent to and spaced from said second working surface and to transport said strip, wherein said linear conduit is oriented so as to transport said strip onto said first working surface of said loop-shaped conduit through said slot;
at least one transducer proximate said first working surface on said one of said exterior surfaces, whereby information can be transferred between said at least one transducer and said strip as said strip is transported past said at least one transducer; and
a fluid source for providing said fluid to said linear conduit and said loop-shaped conduit.

16. The drive of claim 15, wherein said strip is a recording strip, and wherein said first working surface is provided on said exterior surface of said inner peripheral wall, whereby said recording strip is transported around said exterior surface of said inner peripheral wall of said loop-shaped conduit.

17. A method of transferring information between a loop-shaped drive and a recording strip, the loop-shaped drive comprising a loop-shaped conduit defined by an inner peripheral wall and an outer peripheral wall, each of said peripheral walls having an interior surface within said conduit and an external surface outside of said conduit, said conduit having a working surface on said exterior surface of said inner peripheral wall, the method comprising the steps of:
directing fluid, supplied to said conduit, through a first plurality of orifices uniformly distributed throughout said working surface;
supporting a recording strip adjacent to and spaced from said working surface and transporting said strip around said exterior surface of said inner peripheral wall; and
reading/writing information on said recording strip as said strip is transported past at least one transducer.

18. The method of claim 17, further comprising the step of inverting said recording strip within said drive so that both sides of said recording strip can be read/written by said at least one transducer.

19. The method of claim 17, further comprising the step of reversing the direction of travel of said recording strip around said inner peripheral wall by activating fluid streams from a second plurality of orifices in said working surface while deactivating the fluid streams from said first plurality of orifices.

20. The method of claim 17, wherein the step of supporting said recording strip comprises uniformly supporting said strip.

21. A loop-shaped drive comprising:
a first loop-shaped conduit defined by an inner peripheral wall and an outer peripheral wall, each of said peripheral walls having an interior surface within said conduit and an external surface outside of said conduit, said conduit having a first working surface on said inner peripheral wall, said first working surface having a first plurality of orifices uniformly distributed throughout for directing a fluid, supplied to said first conduit, to support a strip and transport it around said inner peripheral wall of said loop-shaped conduit in at least a first direction and into close proximity with at least one transducer, whereby said at least one transducer can sense the properties of said strip;
a second conduit having a second working surface, said second working surface having a second plurality of orifices uniformly distributed throughout for directing fluid, supplied to said second conduit, to support and transport said strip, wherein said second conduit is oriented so as to transport said strip onto said first loop-shaped conduit.

22. The drive of claim 21, wherein said first loop-shaped conduit is configured to provide a second slot through which said strip may pass to enter/exit said first working surface on said inner peripheral wall.

23. A loop-shaped drive for recording strips, comprising:
a loop-shaped conduit defined by an inner peripheral wall and an outer peripheral wall, each of said peripheral walls having an interior surface within said conduit and an external surface outside of said conduit, said first working surface having a first plurality of orifices uniformly distributed throughout for directing fluid, supplied to said loop-shaped conduit, to support a recording strip and transport it around said inner peripheral wall in at least a first direction and into close proximity with at least one transducer, whereby information may be transferred between said at least one transducer and said recording strip; and a linear conduit having a second working surface, said second working surface having a second plurality of orifices uniformly distributed throughout for directing fluid, supplied to said linear conduit, to support and transport said recording strip, wherein said linear conduit is oriented so as to transport said strip onto said first working surface of said loop-shaped conduit through a slot provided in said loop-shaped conduit.

24. The drive of claim 23, wherein said loop-shaped conduit is configured to provide a second slot through which said strip may pass to enter/exit said first working surface on said inner peripheral wall.

* * * * *

UNITED STATES PATENT AND TRADEMARK OFFICE
CERTIFICATE OF CORRECTION

PATENT NO.: 5,432,653
DATED: July 11, 1995
INVENTOR(S): Moore et al.

It is certified that error appears in the above-identified patent and that said Letters Patent is hereby corrected as shown below:

Title page, item [56] under U.S. PATENT DOCUMENTS, "3,428,514" and "3,471,971" should read --3,428,524-- and --3,472,971--, respectively.

On page 2, column 2, after "4,858,808 8/1989 Bingaman 226/95" add --4,919,319 4/90 Ford et al. 226/97--, and after "5,203,485 4/1993 Cahill 226/97" add --5,224,641 7/93 Spicer 226/97-- and --5,297,755 3/94 Felde et al. 242/199--.

In column 10, lines 14-15, "periphery" should read --peripheral--.

In column 10, line 15, "periphery wall" should read --peripheral wall--.

Column 10, line 15, before, "sur-" insert --peripheral walls having an interior surface within said conduit and an exterior surface outside of said conduit, said conduit having a working surface on one of said exterior--.

In column 10, lines 30-31, "periphery" should read --peripheral--.

In column 10, line 32, "periphery" should read --peripheral--.

Signed and Sealed this

Twenty-fourth Day of June, 1997

Attest:

BRUCE LEHMAN

*Attesting Officer*  *Commissioner of Patents and Trademarks*